Figure 1:
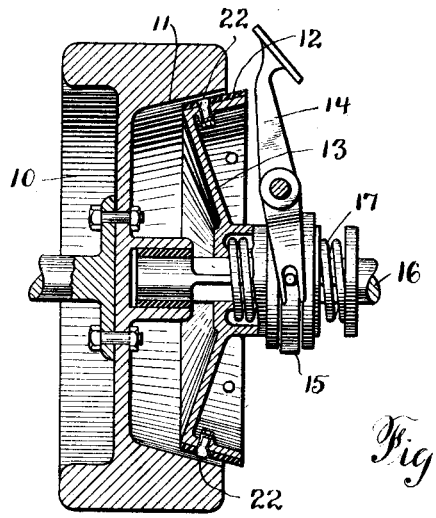

M. P. SLADE.
FRICTION CLUTCH MEMBER.
APPLICATION FILED DEC. 14, 1915.

1,182,431.

Patented May 9, 1916.

Witness
Arthur G. Dannell,

Marshall P. Slade, Inventor,
By his Attorney
W. P. Hutchinson,

UNITED STATES PATENT OFFICE.

MARSHALL P. SLADE, OF MOUNT KISCO, NEW YORK.

FRICTION-CLUTCH MEMBER.

1,182,431.  Specification of Letters Patent.  Patented May 9, 1916.

Application filed December 14, 1915. Serial No. 66,670.

*To all whom it may concern:*

Be it known that I, MARSHALL P. SLADE, a citizen of the United States, and a resident of Mount Kisco, county of Westchester, and State of New York, have invented a new and useful Improvement in Friction-Clutch Members, of which the following is a full, clear, and exact description.

My invention relates to improvements in friction clutches and like structures in which at least one member is provided with a surface adapted to engage another surface with substantial friction.

It has been found in practice that the most satisfactory friction surface is that in which the points of friction are distributed between raised friction contacts, on at least one member of the clutch, and these are generally in the form of inserts, frequently of cork, which are placed in the said clutch member. These inserts are usually made from the face side of the clutch member, although they are sometimes adjusted from the back side of said member. An objection to this construction is that the friction surfaces wear away in the course of time, and it is necessary to renew them. This means that with the ordinary construction the clutch has to be taken apart and the insert made on the face side thereof. This procedure involves a great deal of work, much time, and the services of a skilled mechanic.

My invention is intended to obviate these difficulties, and I accomplish the result by providing an insert in the form of a cartridge containing the friction material and constructing the clutch so that the cartridge can be screwed into the clutch member from the back and the friction material permitted to protrude just the desired distance from the face of the clutch member. By having the cartridge screw into the clutch member from the back, I thus accomplish the result of easy insertion, and moreover adjustment can be readily made so that as the friction surface wears away it can be moved forward the desired distance by the simple turning of the back end of the cartridge. All of which will be clearly understood from the description which follows.

Reference is to be had to the accompanying drawings forming a part of this specification, in which similar reference characters indicate corresponding parts in all the views.

Figure 2:
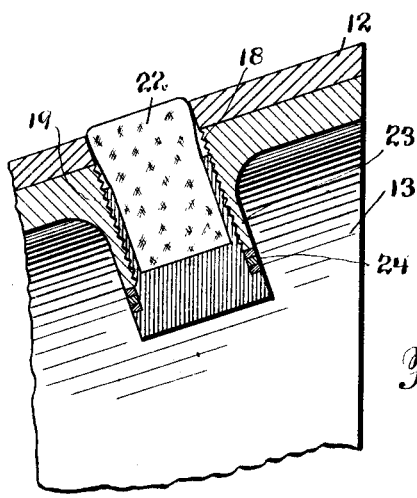
Figure 3:
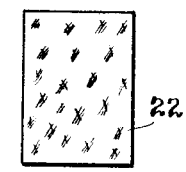
Figure 4:
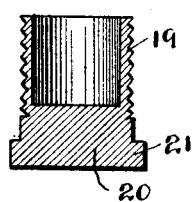

Figure 1 is a section through a well-known form of clutch showing the application of my invention thereto. Fig. 2 is an enlarged cross section through the clutch face and showing in detail the construction and arrangement of my improved cartridge member. Fig. 3 is a detail longitudinal section of the cartridge with the friction material removed therefrom, and Fig. 4 is a detail of the outer end of the cartridge.

In order that my invention may be clearly understood I have shown in Fig. 1 a clutch member having one part 10 provided with an inner face 11 which is adapted to engage the face 12 of the inner clutch member 13. This is provided with a pedal lever connection 14, and the lever connects with a collar 15 on the sliding shaft 16, and the clutch has a spring 17 to throw it into place. The above I have referred to and shown in a general way, as it forms no part of my invention, but it is necessary to clearly illustrate the application thereof, and I wish it distinctly understood that my invention does not relate to any particular form of clutch.

At necessary intervals the face of the member 13 is provided with screw-threaded openings 18 extending entirely through the face, and the thread in the wall of this opening engages a corresponding thread on the cartridge shell 19, this having a solid outer end 20 which is widened and faceted as shown at 21, in order that a wrench may be easily applied thereto. By reference to Fig. 2 it will be seen that the wall of the member 13 is thickened at the point where it is pierced by the cartridge, and that the thread on the shell of the cartridge runs nearly its whole length. In this way a very strong construction is made, and this is necessary because there is a great deal of strain on the contacts of the clutch members when the said members are in engagement. The particular construction of the cartridge shell is not material, however, and the only necessary thing so far as its outer end construction is concerned, is to provide means for applying a wrench or analogous tool in order that the shell may be turned in and out. The cartridge shell contains a friction member 22 which is preferably of cork, as this is found to be a very satisfactory friction material and is capable of compression and is also durable. The cork normally is of somewhat greater diameter than the shell 19, so that it is compressed when inserted in the shell, and is thus held firmly. The wall of the clutch member 13 is preferably thickened as shown at 23 where the cartridge enters, and in practice several washers 24 are preferably used in connection with the cartridge. When a cartridge is inserted it is screwed up tight so that the member 22 will project the required distance from the face of the clutch member 13, and if after a time it requires further adjustment, one or more of the washers 24 can be removed.

It will be seen from the description which I have given that the cartridge complete can be readily applied to the member 13 by simply screwing it into place from the back of the said member without the necessity of taking the clutch apart or disarranging any of the other parts. It will be further noticed that the insert member or cartridge is complete, very easily applied, and very simple to make. As a result I get a very satisfactory form of friction face for a clutch member which can be easily constructed, readily adjusted, and also easily renewed when necessary. It will be further noticed that the form of clutch is immaterial, and that the insert which I have shown and described can be applied from the back of any member to which it is desired to give a friction face.

I claim:—

1. A clutch member having screw threaded holes entirely through it, and cartridges or inserts fitting the aforesaid holes and projecting through the face of said clutch member, the cartridges being exteriorly screw threaded for a greater part of their length.

2. The combination with a clutch member having screw threaded holes extending through it, the said member being thickened at the points where the holes occur, and cartridges or inserts fitting in the aforesaid holes and projecting through the face of the clutch member, said cartridges having an exterior bearing for a greater part of their length against the walls of the holes in the clutch members.

3. A friction clutch having one of its clutch members provided with holes therethrough, cartridges entering the holes from the back and extending beyond the face of the clutch member, said cartridges carrying friction material and having a bearing on their exterior surfaces for a greater part of their length, and means for adjusting the cartridges in and out.

MARSHALL P. SLADE.

Witnesses:
WARREN B. HUTCHINSON,
ARTHUR G. DANNELL.

Copies of this patent may be obtained for five cents each, by addressing the "Commissioner of Patents, Washington, D. C."